A. C. LESNER.
Improvement in Water Wheels.
No. 118,731.  Patented Sep. 5, 1871.
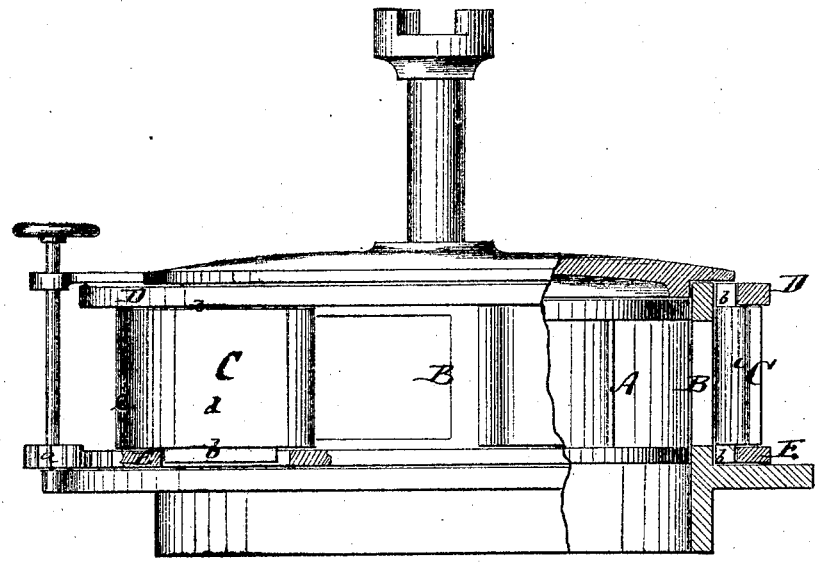
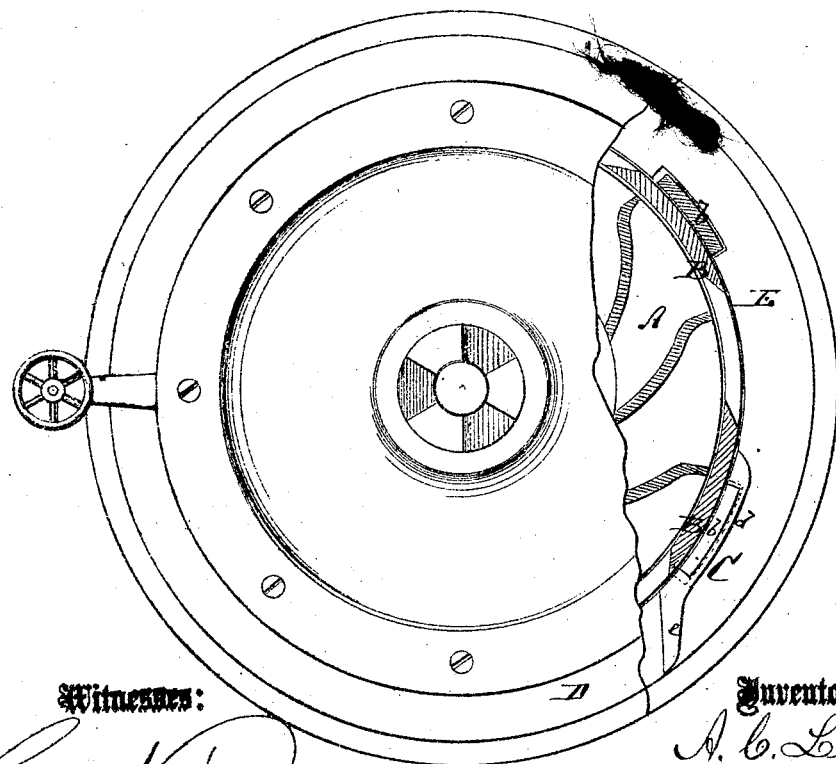

//  118,731

UNITED STATES PATENT OFFICE.

ALEXANDER C. LESNER, OF FONDA, NEW YORK, ASSIGNOR TO HIMSELF AND ABRAM V. DAVIS, OF NEW YORK CITY.

IMPROVEMENT IN WATER-WHEELS.

Specification forming part of Letters Patent No. 118,731, dated September 5, 1871.

*To all whom it may concern:*

Be it known that I, ALEXANDER C. LESNER, of Fonda, in the county of Montgomery and State of New York, have invented a new and Improved Water-Wheel; and I do hereby declare that the following is a full, clear, and exact description thereof, which will enable others skilled in the art to make and use the same, reference being had to the accompanying drawing forming a part of this specification, in which—

Figure 1 represents a side view, partly in section, of my improved water wheel. Fig. 2 is a plan view, partly in section, of the same.

Similar letters of reference indicate corresponding parts.

This invention relates to a new manner of arranging the gates of a water-wheel in their annular supports; and consists in making them independently adjustable in said supports, and slightly yielding to the varying degrees of pressure by the water.

A in the drawing represents a water-wheel of suitable form and construction. It is hung in a suitable frame, and arranged in all its parts in the usual or other manner. B is the circle of chutes for the wheel, set up stationary around the same. The chutes are set concentric, as shown, and have their inner faces so curved that the buckets of the wheel will always be in contact with them, except where the perforations are made for the admission of water. By this arrangement I concentrate the power of the water before admitting it to the buckets, and do not spread it as is usually done. C C are the gates, whereby the size of openings for the admission of water can be regulated at will. These gates are secured in and between rings D and E, which constitute the annular frame of the gates, and are placed around the chutes as shown. A pinion, $a$, meshes into the toothed portion of the edge of the lower ring E, and is used for turning said ring and thereby adjusting the position of the gates in the desired manner. Each gate C has projecting tenons $b\ b$ at the ends, which enter slotted or grooved sockets provided for their reception in the rings D E. These sockets are somewhat longer than the tenons, as is clearly shown in Fig. 2, so that the gates will have slight play in the rings. The gates can thus yield to the force of influx of water or change of current and avoid a considerable amount of friction. More power is thus gained. The gates are made L-shaped. Their longer arms $d$ are curved to fit against the circular circumference of the chutes; the short arms $e$ project from the long at an angle of about one hundred and thirty-five degrees, and have their working faces quite straight and smooth, while the backs may be rounded, as shown in Fig. 2. In this manner the gates, with their projections $e$, serve as actual extensions of the chutes, and permit the use of a narrow chute-ring.

Having thus described my invention, what I claim as new, and desire to secure by Letters Patent, is—

In water-wheels, a series of gates, C, constructed with projecting tenons $b\ b$ that fit loosely in the mortises of rings D E, as and for the purpose specified.

ALEXANDER C. LESNER.

Witnesses:
PETER A. GRAFF,
WM. D. SCHOOLCRAFT.                 (118.)